(12) United States Patent
Ito et al.

(10) Patent No.: US 11,740,753 B2
(45) Date of Patent: Aug. 29, 2023

(54) DISPLAY DEVICE

(71) Applicant: Japan Display Inc., Tokyo (JP)

(72) Inventors: Kaoru Ito, Tokyo (JP); Akihiko Fujisawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/579,708

(22) Filed: Jan. 20, 2022

(65) Prior Publication Data
US 2022/0236835 A1    Jul. 28, 2022

(30) Foreign Application Priority Data

Jan. 22, 2021    (JP) ................ 2021-008654

(51) Int. Cl.
*G06F 3/044*      (2006.01)
*G02F 1/1339*   (2006.01)
*G02F 1/1333*   (2006.01)
*G02F 1/1362*   (2006.01)

(52) U.S. Cl.
CPC .......... *G06F 3/0448* (2019.05); *G02F 1/1339* (2013.01); *G02F 1/13338* (2013.01); *G02F 1/136286* (2013.01); *G06F 2203/04107* (2013.01)

(58) Field of Classification Search
CPC ......... G06F 3/0448; G06F 2203/04107; G06F 3/0412; G06F 3/044; G02F 1/13338; G02F 1/1339; G02F 1/136286
See application file for complete search history.

(56) References Cited

U.S. PATENT DOCUMENTS

| | | | |
|---|---|---|---|
| 2013/0314625 A1* | 11/2013 | Tsai | .................. G02F 1/13338 349/12 |
| 2019/0095008 A1 | 3/2019 | Murata | |
| 2019/0302942 A1* | 10/2019 | Kim | .................. G06F 3/04164 |
| 2019/0369787 A1* | 12/2019 | Park | .................. G06F 3/0412 |

FOREIGN PATENT DOCUMENTS

JP    2019-061563 A    4/2019

* cited by examiner

*Primary Examiner* — Amit Chatly
(74) *Attorney, Agent, or Firm* — K&L Gates LLP

(57) ABSTRACT

According to one embodiment, a display device includes a first substrate, a second substrate, a sealant, a first electrode, an insulating film and a second electrode. The sealant bonds the first substrate and the second substrate and is provided in a peripheral area surrounding a display area. The first electrode is provided on the first substrate in the peripheral area. The insulating film covers the first electrode. The second electrode is provided on the second substrate in the peripheral area. The sealant contains a conductive member. At least one of the first electrode and the second electrode includes a plurality of fine line portions in an area where the first electrode, the insulating film, the sealant, and the second electrode are overlapped in planar view.

11 Claims, 14 Drawing Sheets

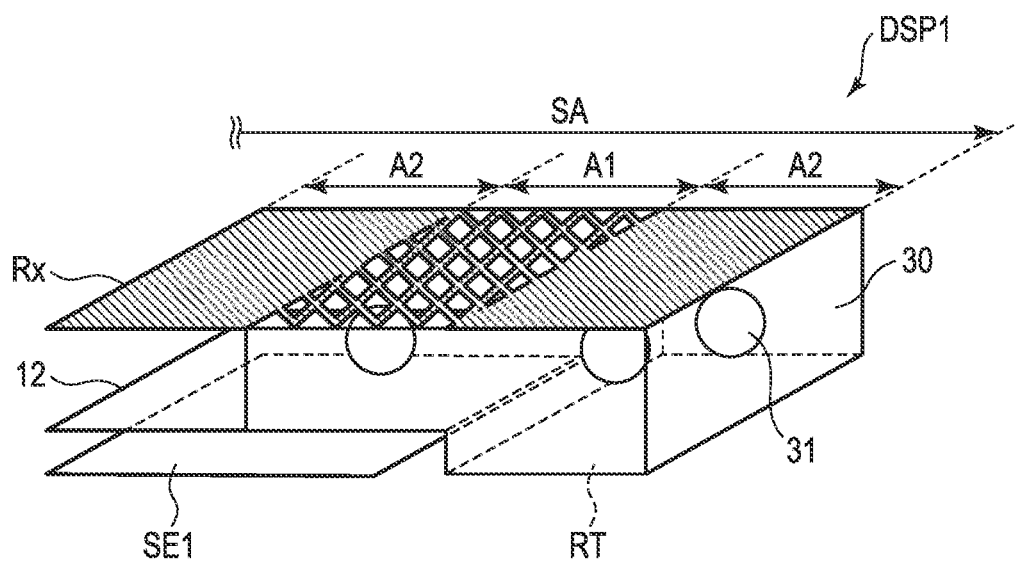
F I G. 6
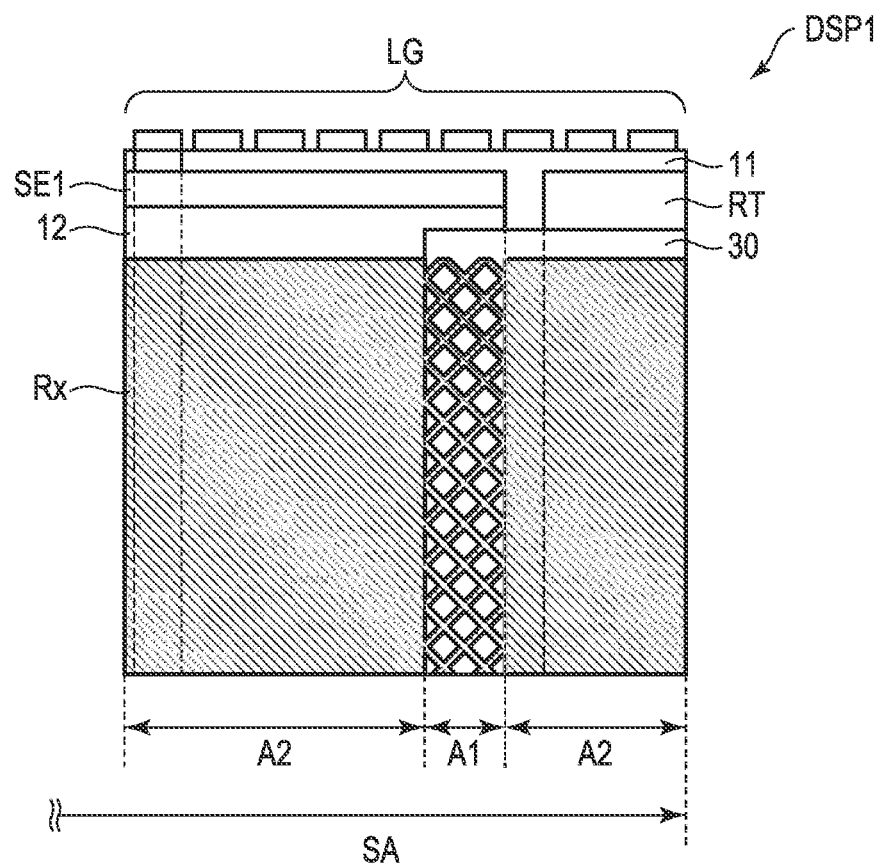
F I G. 7

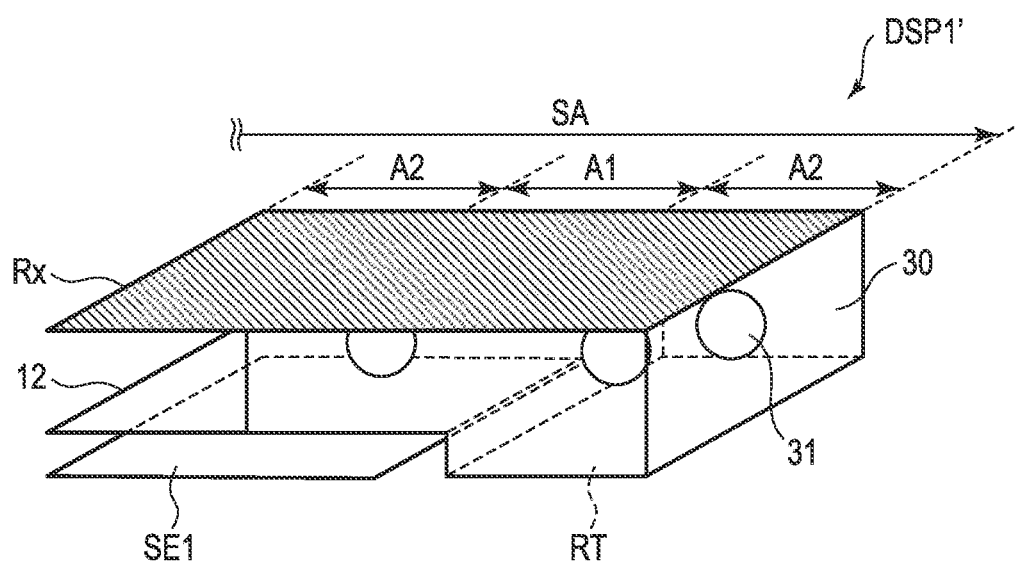
F I G. 8
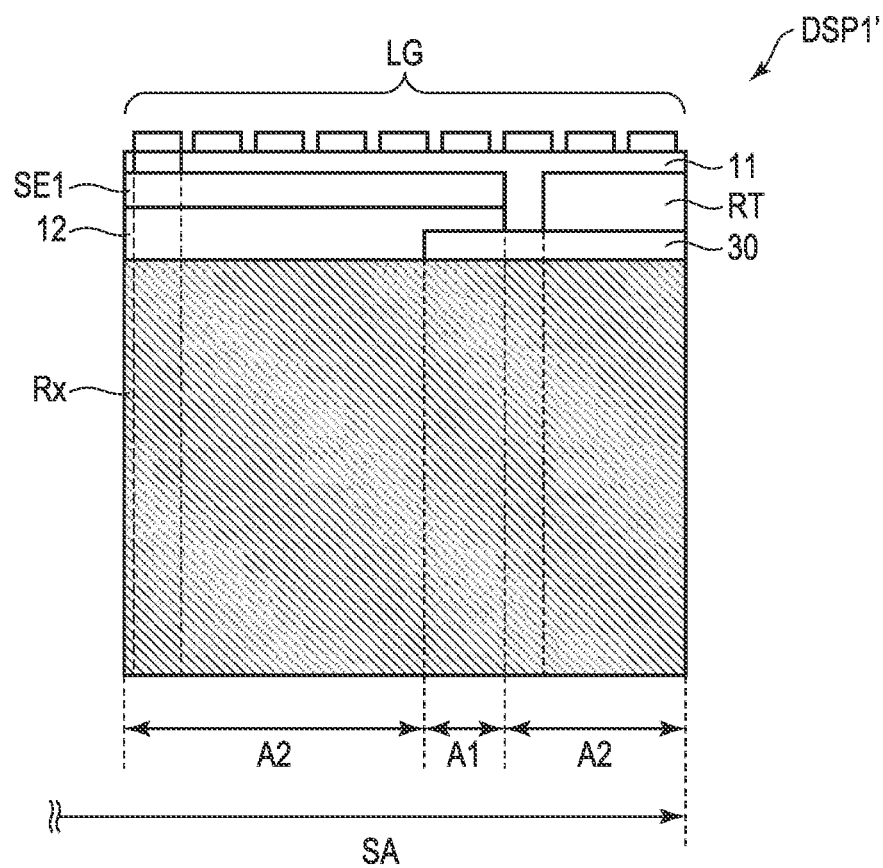
F I G. 9

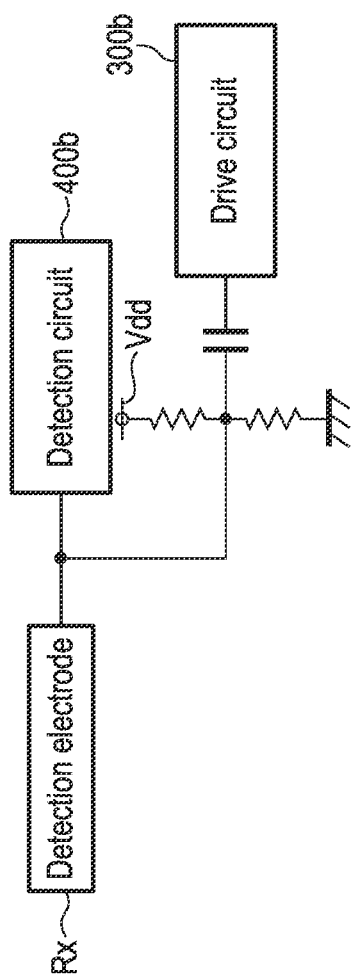
F I G. 20

DISPLAY DEVICE

CROSS-REFERENCE TO RELATED APPLICATIONS

This application is based upon and claims the benefit of priority from Japanese Patent Application No. 2021-008654, filed Jan. 22, 2021, the entire contents of which are incorporated herein by reference.

FIELD

Embodiments described herein relate generally to a display device.

BACKGROUND

In recent years, wearable devices (for example, wristwatch-type wearable devices, eyeglass-type wearable devices, and the like) have gradually become prevalent as a type of display devices with a touch detection function. Such wearable devices are required to have both display quality when displaying images and excellent touch operability, and various developments have been made. For example, a wearable device having a configuration in which touch sensors is arranged around a display area for displaying an image has been developed.

BRIEF DESCRIPTION OF THE DRAWINGS

FIG. 6 is an exploded perspective view showing a partial configuration located in a peripheral area of the display device according to the embodiment.

FIG. 7 is a plan view showing a partial configuration located in the peripheral area of the display device according to the embodiment.

FIG. 8 is an exploded perspective view showing a partial configuration located in a peripheral area of a display device pertaining to a comparative example.

FIG. 9 is a plan view showing a partial configuration located in the peripheral area of the display device according to the comparative example.

FIG. 20 is a diagram illustrating an example of a principle of self-capacitive touch detection.

DETAILED DESCRIPTION

Figure 1:
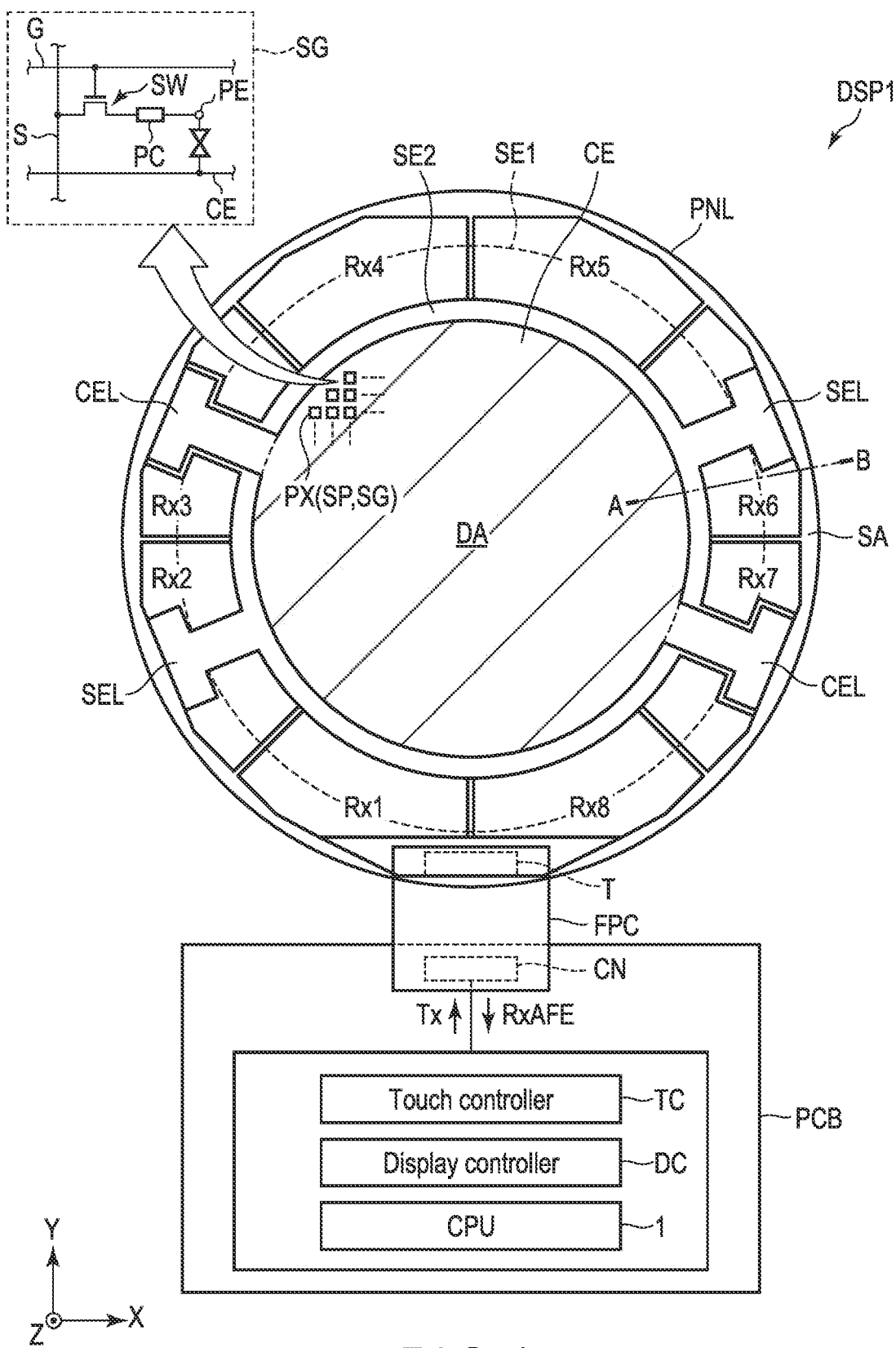
FIG. 1 is a plan view showing a configuration example of a display device according to a first embodiment.

In general, according to one embodiment, a display device includes a first substrate, a second substrate, a sealant, a first electrode, an insulating film and a second electrode. The second substrate is arranged opposite to the first substrate. The sealant bonds the first substrate and the second substrate and is provided in a peripheral area surrounding a display area where an image is displayed. The first electrode is provided on the first substrate in the peripheral area. The insulating film covers the first electrode. The second electrode is provided on the second substrate in the peripheral area. The sealant contains a conductive member. At least one of the first electrode and the second electrode includes a plurality of fine line portions in an area where the first electrode, the insulating film, the sealant, and the second electrode are overlapped in planar view.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the embodiments are schematically illustrated in the drawings, compared to the actual modes. However, the schematic illustration is merely an example, and adds no restrictions to the interpretation of the invention. Besides, in the specification and drawings, structural elements performing the functions that are the same as or similar to those described above in connection with preceding drawings are denoted by like reference numerals, detailed description thereof being omitted unless necessary.

In each embodiment, a display device with a touch detection function will be described as an example of a display device. The touch detection types include various types such as an optical type, a resistive type, a capacitive type, and an electromagnetic induction type. The capacitive type of the various detection types is a detection type based on a phenomenon that the capacitance changes due to approach or contact of an object (for example, a finger or the like), and has advantages that the device can be implemented with a relatively simple structure, power consumption is low, and the like. In each embodiment, a display device with a touch detection function of the capacitive type is mainly described.

The capacitive type implies the mutual capacitive type, which generates an electric field between a pair of a transmitting electrode (drive electrode) and a receiving electrode (detection electrode) arranged in a state of being separated from each other to detect changes in the electric field caused due to approach or contact of an object, and the self-capacitive type, which uses a single electrode to detect changes in capacitance caused due to the approach or contact of an object. In each embodiment, a display device with a touch detection function of the self-capacitive type will be mainly described.

First Embodiment

FIG. 1 is a plan view showing a configuration example of a display device DSP1 according to a first embodiment. For example, the first direction X, the second direction Y, and the third direction Z are orthogonal to each other but may intersect at an angle other than 90 degrees. The first direction X and the second direction Y correspond to the directions parallel to the main surface of a substrate constituting the display device DSP, and the third direction Z corresponds to the thickness direction of the display device DSP1. The third direction Z is defined herein as an upper or upward direction, and a direction opposite to the third direction Z is defined herein as a lower or downward direction. According to "a second member above/on a first member" and "a second member below/under a first member", the second member may be in contact with the first member or may be separated from the first member. In addition, an observation position at which the display device DSP is to be observed is assumed to be set at the pointing end side of the arrow indicating the third direction Z, and viewing toward an X-Y plane defined by the first direction X and the second direction Y from this observation position is hereinafter referred to as planar view.

As shown in FIG. 1, a display device DSP1 comprises a display panel PNL, a flexible printed circuit wiring board FPC, and a printed circuit board PCB. The display panel PNL and the printed circuit board PCB are electrically connected to each other via the flexible printed circuit board FPC. More specifically, a terminal portion T of the display panel PNL and a connection portion CN of the printed circuit board PCB are electrically connected to each other via the flexible printed circuit board FPC.

The display panel PNL has a display area DA for displaying an image and a frame-shaped peripheral area SA surrounding the display area DA. The display area DA may be referred to as the display portion. The peripheral area SA may be referred to as a peripheral portion, a frame portion or a non-display portion. Pixels PX are arranged in the display area DA. More specifically, a large number of pixels PX are arrayed in a matrix along the first direction X and the second direction Y in the display area DA.

In the present embodiment, the pixel PX includes red (R), green (G), and blue (B) sub-pixels SP. In addition, each sub-pixel SP includes a plurality of segment pixels SG. Each segment pixel SG includes a pixel electrode with a different area, and gradation is formed for each sub-pixel SP by switching the display/non-display of these segment pixels SG.

As shown and enlarged in FIG. 1, the segment pixel SG comprises a switching element SW, a pixel circuit PC, a pixel electrode PE, a common electrode CE, a liquid crystal layer LC and the like.

The switching element SW is constituted by, for example, a thin-film transistor (TFT) and is electrically connected to a scanning line G and a signal line S. The scanning line G is electrically connected to the switching element SW in each of the segment pixels SG arranged in the first direction X. The signal line S is electrically connected to the switching element SW in each of the segment pixels SG arranged in the second direction Y.

The pixel electrode PE is electrically connected to the switching element SW via the pixel circuit PC. Each of the pixel electrodes PE is opposed to the common electrode CE, and drives the liquid crystal layer LC by an electric field produced between the pixel electrode PE and the common electrode CE. In the present embodiment, a configuration in which the pixel electrode PE is electrically connected to the switching element SW via the pixel circuit PC is exemplified, but the pixel electrode PE may be electrically connected to the switching element SW without the pixel circuit PC.

Of a plurality of concentric circles of FIG. 1, the area represented by the innermost circle corresponds to the display area DA, and the area between the outermost circle and the innermost circle corresponds to the peripheral area SA. In other words, an area with hatch lines in FIG. 1 corresponds to the display area DA and the other area corresponds to the peripheral area SA.

In the present embodiment, the case in which the display area DA has a circular shape and the peripheral area SA surrounding the display area DA also has a shape of the same type, but the areas are not limited thereto, and the display area DA may not have a circular shape and the peripheral area SA may have a shape of a different type from the display area DA. For example, the display area DA and the peripheral area SA may have polygonal shapes. Furthermore, when the display area DA has a polygonal shape, the peripheral area SA may have a circular shape, which is a shape of a different type from the display area DA.

The common electrode CE described above is arranged over the entire surface in the display area DA. In addition, as shown in FIG. 1, the common electrode CE includes a first lead wiring line CEL extending to vicinities of outer peripheries of detection electrodes Rx3 and Rx7 to be described later. The first lead wiring line CEL extends from the display area DA to the peripheral area SA, and is electrically connected to a wiring line (not shown) for applying power to the common electrode CE via conductive pearls (conductive members) contained in a sealant to be described later. Each of the detection electrodes Rx3 bisected by the first lead wiring line CEL is electrically connected via an Rx terminal portion RT to be described later. Similarly, each of the detection electrodes Rx7 bisected by the first lead wiring line CEL is electrically connected via the Rx terminal portion RT to be described later.

As shown in FIG. 1, a plurality of detection electrodes Rx1 to Rx8 are arranged in the peripheral area SA so as to surround the display area DA. Eight detection electrodes Rx1 to Rx8 are exemplified in FIG. 1, but the number of detection electrodes Rx arranged in the peripheral area SA is not limited thereto, and any number of detection electrodes Rx may be arranged to surround the display area DA.

The detection electrodes Rx1 to Rx8 are electrically connected to the terminal portion T arranged in the peripheral area SA via an Rx wiring line (not shown). The Rx wiring line extends, for example, along the outer periphery of the detection electrodes Rx1 to Rx8. The Rx wiring line is a wiring line used for supplying drive signals Tx to the detection electrodes Rx1 to Rx8, and for outputting detection signals RxAFE from the detection electrodes Rx1 to Rx8.

In addition, as shown in FIG. 1, a first shield electrode SE1 and a second shield electrode SE2 are arranged in the peripheral area SA so as to surround the display area DA. More specifically, the first shield electrode SE1 of an annular shape (donut shape) is arranged so as to surround the display area DA, in planar view. In addition, the second shield electrode SE2 is arranged so as to surround the common electrode CE in planar view. The first shield electrode SE1 and the second shield electrode SE2 are at least partially overlapped on each other in planar view, and the first shield electrode SE1 is arranged under the second shield electrode SE2.

As shown in FIG. 1, the second shield electrode SE2 includes a second lead wiring line SEL that extends to vicinities of outer peripheries of the detection electrodes Rx2 and Rx6 and that is electrically connected to a wiring line (not shown) for applying power to the second shield electrode SE2 via the conductive pearls (conductive members) contained in a seal material to be described later. Each of the detection electrodes Rx2 bisected by the second lead wiring line SEL is electrically connected via the Rx terminal portion RT to be described later. Similarly, each of the detection electrodes Rx6 bisected by the second lead wiring line SEL is electrically connected via the Rx terminal section RT to be described later.

A GND voltage (with a same potential as the detection electrode Rx) or a predetermined DC voltage (fixed voltage) is applied to the first shield electrode SE1 and the second shield electrode SE2 via the various wiring lines described above.

As shown in FIG. 1, a touch controller TC, a display controller DC, a CPU 1, and the like are provided on the printed circuit board PCB.

The touch controller TC outputs a drive signal Tx to the detection electrodes Rx1 to Rx8 arranged on the display panel PNL, and receives input of a detection signal (RxAFE signal) from the detection electrodes Rx1 to Rx8 (i.e., detects approach or contact of an external proximate object). The touch controller TC may be referred to as a detection unit.

The display controller DC outputs a video signal indicating an image to be displayed in the display area DA of the display panel PNL.

The CPU 1 executes outputting a synchronous signal that defines the operation timing of the touch controller TC and the display controller DC, an operation responding to a touch detected by the touch controller TC, and the like.

Figure 2:
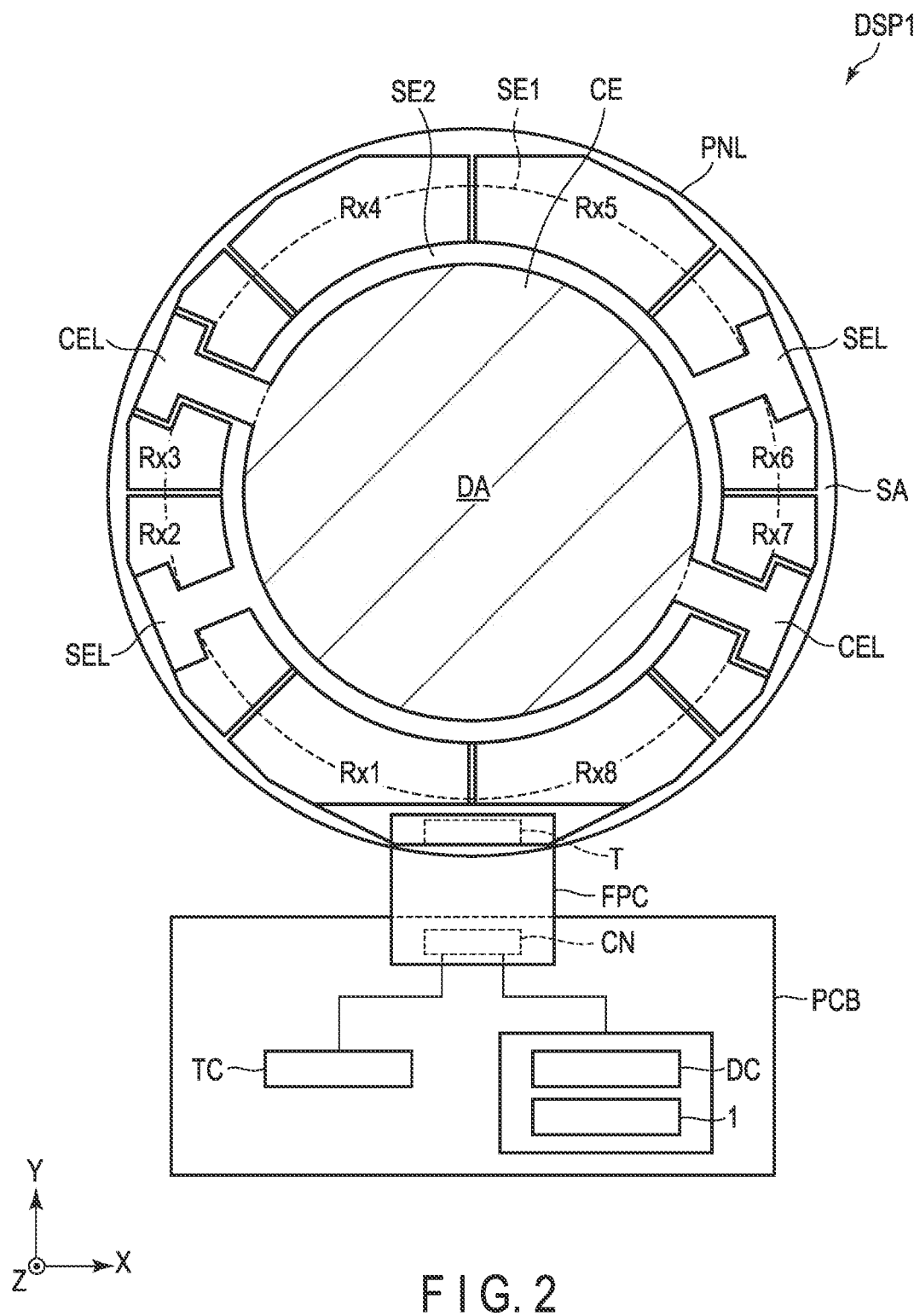
FIG. 2 is a plan view showing another configuration example of the display device according to the embodiment.
Figure 3:
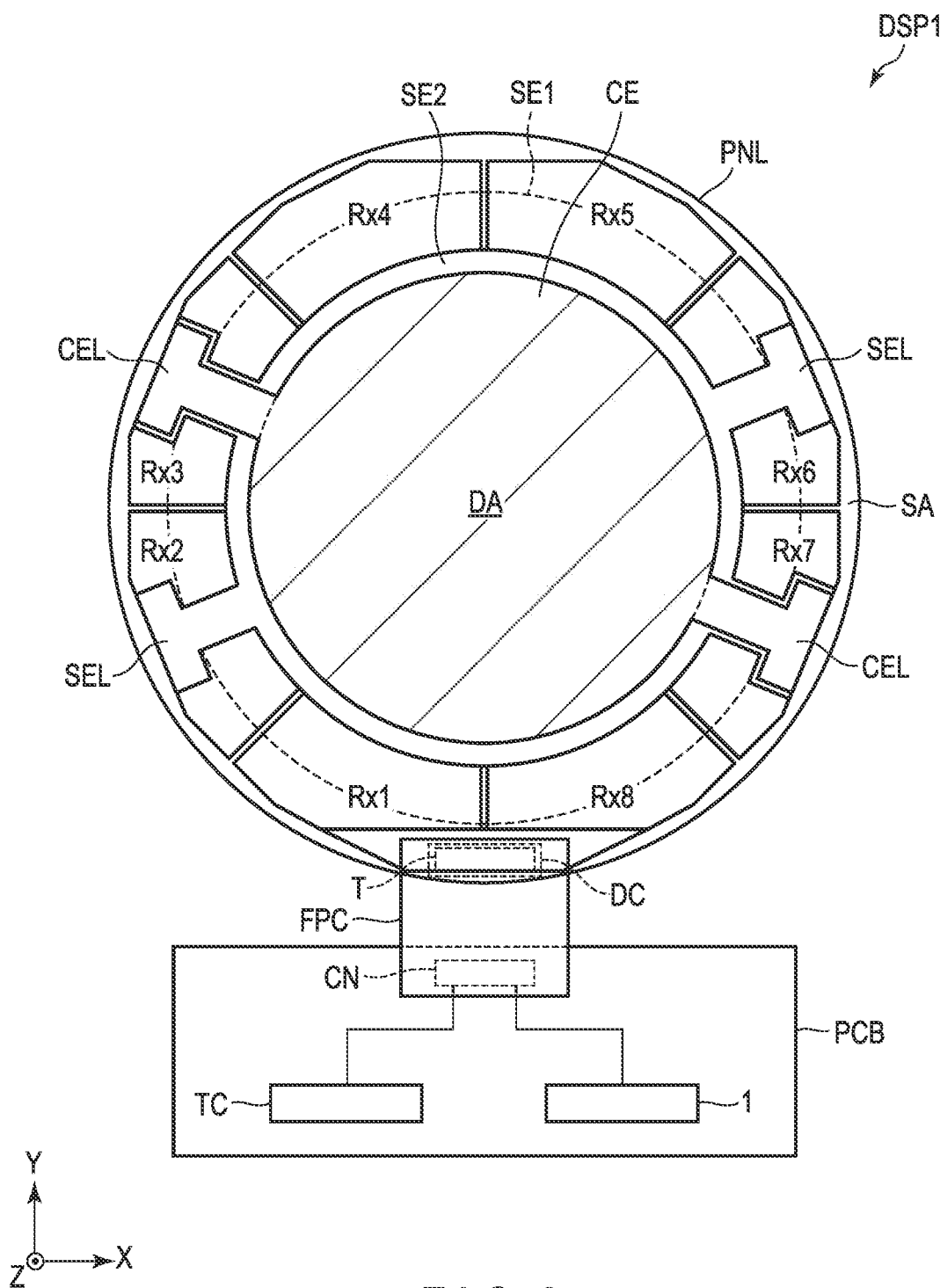
FIG. 3 is a plan view showing yet another configuration example of the display device according to the embodiment.
Figure 4:
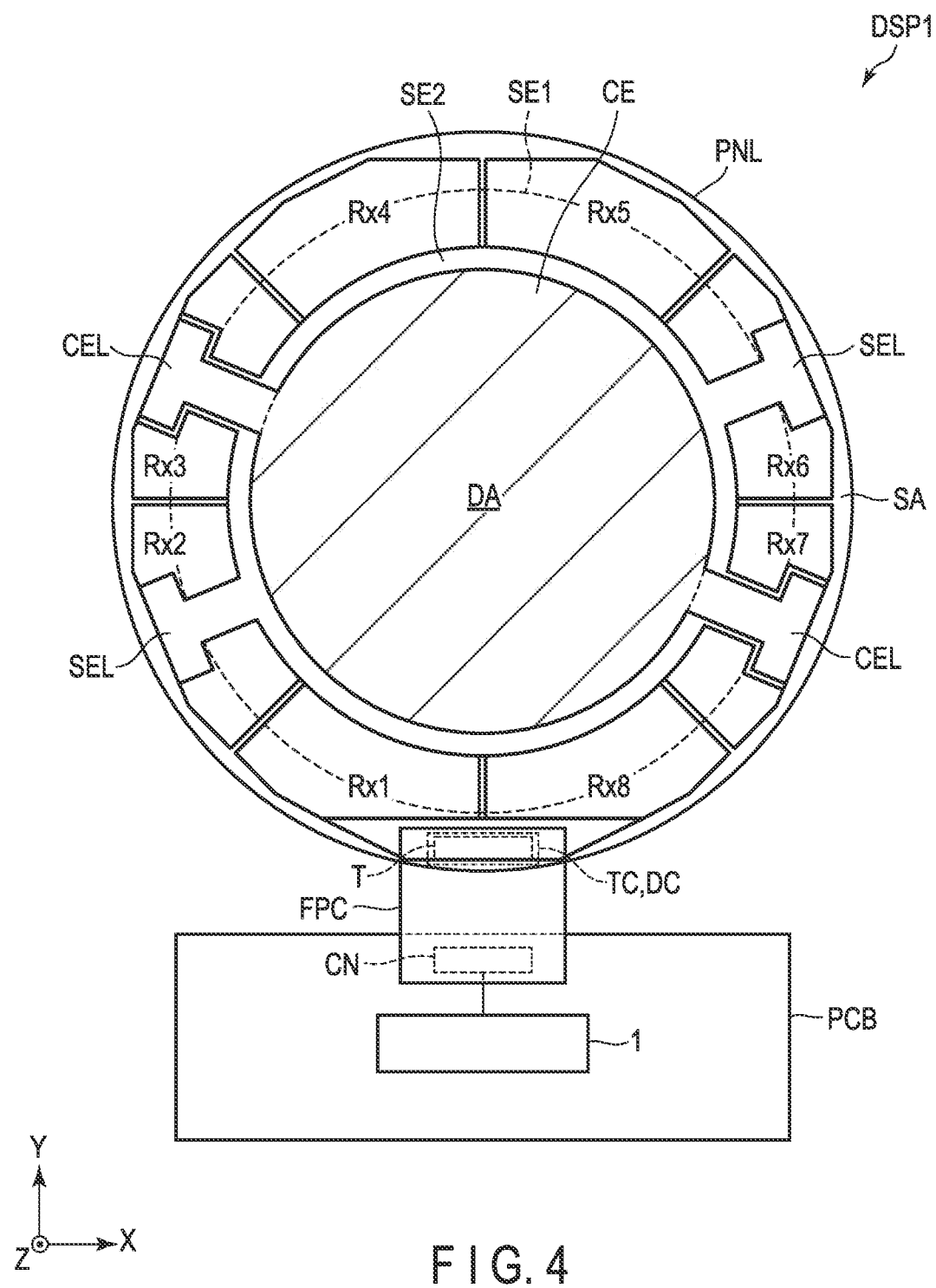
FIG. 4 is a plan view showing yet another configuration example of the display device according to the embodiment.

In FIG. 1, the case where the touch controller TC, display controller DC, and the CPU1 are realized by one semiconductor chip has been exemplified, but their mounting aspects are not limited to this and, for example, only the touch controller TC may be separated as a separate body and each portion may be mounted on the printed circuit board PCB as shown in FIG. 2, the touch controller TC and the CPU 1 may be separately mounted on the printed circuit board PCB and the display controller DC may be mounted on the display panel PNL by Chip On Glass (COG) as shown in FIG. 3, or only the CPU 1 may be mounted on the printed circuit board PCB and the touch controller TC and the display controller DC may be mounted on the display panel PNL by COG as shown in FIG. 4.

Figure 5:
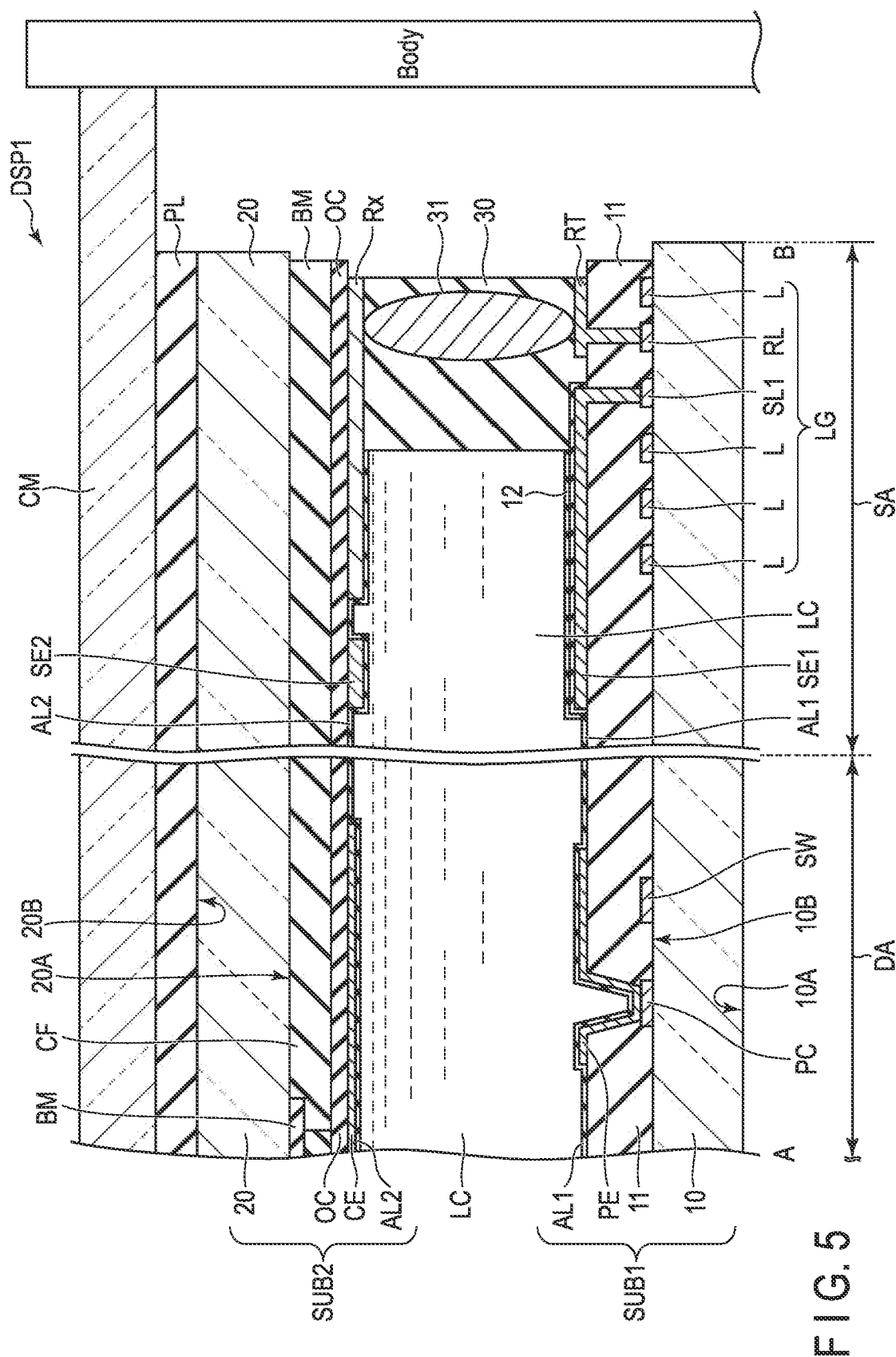
FIG. 5 is a cross-sectional view showing a cross section of the display device taken along line A-B of FIG. 1.

FIG. 5 is a cross-sectional view showing a cross section of the display device DSP1 taken along line A-B of FIG. 1. Each of the constitution on the display area DA side and the constitution on the peripheral area SA side will be described below.

The display device DSP1 comprises a first substrate SUB1, a second substrate SUB2, a sealant 30, a liquid crystal layer LC, a polarizer PL, and a cover member CM. The first substrate SUB1 may be referred to as an array substrate, and the second substrate SUB2 may be referred to as a counter-substrate. The first substrate SUB1 and the second substrate SUB2 are formed in a flat plate shape parallel to the X-Y plane.

The first substrate SUB1 and the second substrate SUB2 are overlapped in planar view and are bonded (connected) by the sealant 30. The liquid crystal layer LC is held between the first substrate SUB1 and the second substrate SUB2 and is sealed by the sealant 30. The sealant 30 contains a large number of conductive pearls 31 coated with metal, and the constitution on the first substrate SUB1 side and the constitution on the second substrate SUB2 side are thereby electrically connected to each other.

A polarizer PL is provided on the second substrate SUB2, and a cover member CM is further provided on the polarizer PL.

The case where the display device DSP1 is a reflective display device in which a backlight unit is not arranged is exemplified in FIG. 5, but the display device DSP1 is not limited thereto and may be a display device employing organic EL as pixels or a transmissive display device in which a backlight unit is arranged. Alternatively, the display device DSP1 may be a display device obtained by combining a reflective display device and a transmissive display device. Various types of backlight units can be employed as the backlight unit and, for example, a backlight unit using a light-emitting diode (LED) as a light source, a backlight unit using a cold-cathode tube (CCFL) and the like, can be employed. When the backlight unit is arranged, a polarizer is arranged between the first substrate SUB1 and the backlight unit (that is, under the first substrate SUB1).

On the display area DA side, the first substrate SUB1 is provided with a transparent substrate 10, a switching element SW, a pixel circuit PC, a planarization film 11, a pixel electrode PE, and an alignment film AL1, as shown in FIG. 5. In addition to the above-described constitution, the first substrate SUB1 is provided with a scanning line G, a signal line S, and the like as shown in FIG. 1, but their illustration is omitted in FIG. 5.

The transparent substrate 10 is provided with a main surface (lower surface) 10A and a main surface (upper surface) 10B on a side opposite to the main surface 10A. The switching element SW and the pixel circuit PC are arranged on the main surface 10B side. The planarization film 11 is composed of at least one or more insulating films and covers the switching element SW and the pixel circuit PC.

The pixel electrode PE is arranged on the planarization film 11 and is connected to the pixel circuit PC through a contact hole formed in the planarization film 11. The switching element SW, the pixel circuit PC, and the pixel electrode PE are arranged in each segment pixel SG. The alignment film AL1 covers the pixel electrode PE and is in contact with the liquid crystal layer LC.

The switching element SW and the pixel circuit PC are simply illustrated in FIG. 5, but, in reality, the switching element SW and the pixel circuit PC include semiconductor layers and electrodes of each layer. In addition, the switching element SW and the pixel circuit PC are electrically connected to each other though its illustration is omitted in FIG. 5. Furthermore, as described above, the scanning line G and the signal line S, which are omitted in FIG. 5, are arranged, for example, between the transparent substrate 10 and the planarization film 11.

On the display area DA side, the second substrate SUB2 is provided with a transparent substrate 20, a light-shielding film BM, a color filter CF, an overcoat layer OC, a common electrode CE, and an alignment film AL2, as shown in FIG. 5.

The transparent substrate 20 has a main surface (lower surface) 20A and a main surface (upper surface) 20B on a side opposite to the main surface 20A. The main surface 20A of the transparent substrate 20 is opposed to the main surface 10B of the transparent substrate 10. The light-shielding film BM divides each segment pixel SG. The color filter CF is arranged on the main surface 20A of the transparent substrate 20, opposed to the pixel electrodes PE, and partially overlapped on the light-shielding film BM. The color filter CF includes a red color filter, a green color filter, a blue color filter, and the like. The overcoat layer OC covers the color filter CF.

The common electrode CE is arranged over the segment pixels SG (pixels PX) and opposed to the pixel electrodes PE in the third direction Z. The common electrode CE is arranged on the overcoat layer OC. The alignment film AL2 covers the common electrode CE and is in contact with the liquid crystal layer LC.

The liquid crystal layer LC is arranged between the main surface 10B and the main surface 20A.

The transparent substrates 10 and 20 are, for example, insulating substrates such as glass substrates or plastic substrates. The insulating film 11 is formed of, for example, a transparent insulating material such as a silicon oxide, a silicon nitride, a silicon oxynitride or an acrylic resin. For example, the planarization film 11 includes an inorganic insulating film and an organic insulating film.

The pixel electrode PE is formed as a reflective electrode and has, for example, a three-layer stacked structure of indium zinc oxide (IZO), silver (Ag), and indium zinc oxide (IZO). The pixel electrode PE may not be formed as the above-described reflective electrode, but may have a constitution in which, for example, a metal such as silver (Ag) is arranged on the pixel electrode PE formed by a transparent electrode. The common electrode CE is, for example, a transparent electrode formed of a transparent conductive material such as indium tin oxide (ITO) or indium zinc oxide (IZO).

The alignment films AL1 and AL2 are horizontal alignment films having an alignment restriction force substantially parallel to the X-Y plane. The alignment restriction force can be imparted by a rubbing treatment or by an optical alignment treatment.

On the peripheral area SA side, the first substrate SUB1 comprises the transparent substrate 10, a wiring line group LG including a plurality of wiring lines L, the planarization film 11, the first shield electrode SE1, the Rx terminal portion RT, the interlayer insulating film 12, and the alignment film AL1, as shown in FIG. 5. Details of the already described constitution on the display area DA side will be omitted below.

The wiring line group LG including the wiring lines L is arranged on the main surface 10B side of the transparent substrate 10. The wiring lines L included in the wiring line group LG are covered with the planarization film 11. In FIG. 5, six wiring lines Ls including a first shield wiring line SL1 and an Rx wiring line RL to be described below are illustrated as the wiring lines Ls included in the wiring line group LG, but the number of the wiring lines L included in the wiring line group LG is not limited thereto. The wiring lines L included in the wiring line group LG may further include the signal line S, a wiring line for applying power to the second shield electrode SE2, a wiring line for applying power to the common electrode CE, and the like.

The first shield electrode SE1 is provided on the planarization film 11, and is arranged to be opposed to (parts of) the wiring lines L included in the wiring line group LG and to be positioned between the wiring line group LG and the detection electrode Rx in the third direction Z. For this reason, the first shield electrode SE1 is arranged on the same layer as the pixel electrode PE on the display area DA side, and is formed of, for example, the same transparent conductive material as the pixel electrode PE.

The first shield electrode SE1 is connected to the first shield wiring line SL1, which is one of the wiring lines included in the wiring line group LG, through a contact hole formed in the planarization film 11. The above-mentioned contact hole is formed at a position overlapped on the sealant 30 in planar view. That is, the first shield electrode SE1 extends from an area where the sealant 30 is not arranged, in the peripheral area SA (i.e., an area where the liquid crystal layer LC is arranged in the peripheral area SA) to a part of the area where the sealant 30 is arranged, and is connected to the first shield wiring line SL1 through the above-mentioned contact hole.

A GND voltage (with a same potential as the detection electrode Rx) or a predetermined DC voltage (fixed voltage) is applied to the first shield electrode SE1 via the first shield wiring line SL1. According to this, the first shield electrode SE1 can suppress the detection electrode Rx from capacitively coupling with other constituent elements (for example, the wiring lines L included in the wiring line group LG).

The Rx terminal portion RT is provided on the planarization film 11. The Rx terminal portion RT is provided at a position overlapped on the sealant 30 in planar view, and is connected to the Rx wiring line RL, which is one of the wiring lines included in the wiring line group LG, through a contact hole formed in the planarization film 11. The Rx terminal portion RT is electrically connected to the detection electrode Rx provided on the second substrate SUB2 side by the conductive pearls 31 contained in the sealant 30.

The interlayer insulating film 12 is provided to cover the first shield electrode SE1. The alignment film AL1 covers the planarization film 11 and the interlayer insulating film 12 and is in contact with the liquid crystal layer LC, in the area where the liquid crystal layer LC is arranged in the peripheral area SA.

On the peripheral area SA side, the second substrate SUB2 comprises the transparent substrate 20, the light-shielding film BM, the overcoat layer OC, the second shielding electrode SE2, the detection electrode Rx, and the alignment film AL2, as shown in FIG. 5. Details of the already described constitution on the display area DA side will be omitted below.

The light-shielding film BM is arranged on the main surface 20A side of the transparent substrate 20. The light-shielding film BM is arranged over the substantially entire surface of the peripheral area SA. The overcoat layer OC covers the light-shielding film BM together with the color filter CF on the display area DA side.

The second shield electrode SE2 is arranged on the overcoat layer OC. The second shield electrode SE2 is arranged closer to the display area DA than the detection electrode Rx (i.e., between the detection electrode Rx and the display area DA) in planar view. The second shield electrode SE2 is arranged on the same layer as the common electrode CE on the display area DA side, and is formed of, for example, the same transparent conductive material as the common electrode CE. The second shield electrode SE2 extends to the area where the seal material 30 is arranged in a cross section different from the cross section illustrated in FIG. 5, and is electrically connected to a shield terminal portion (not shown) and a second shield wiring line (not shown) arranged on the first substrate SUB1 side by the conductive pearls 31 contained in the sealant 30.

A GND voltage (with a same potential as the detection electrode Rx) or a predetermined DC voltage (fixed voltage) is applied to the second shield electrode SE2 via the second shield wiring line, the shield terminal portion, and the conductive pearls 31 described above. According to this, the second shield electrode SE2 can suppress the detection electrode Rx from being capacitively coupled with other constituent elements (for example, the pixel electrode PE and the common electrode CE on the display area DA side).

As shown in FIG. 5, the detection electrode Rx, like the second shield electrode SE2, is arranged on the same layer as the common electrode CE on the display area DA side, and is formed of, for example, the same transparent conductive material as the common electrode CE. The detection electrode Rx extends from the area where the sealant 30 is not arranged in the peripheral area SA (i.e., the area where the liquid crystal layer LC is arranged in the peripheral area SA) to the area where the seal material 30 is arranged, and is electrically connected to the Rx terminal portion RT and the Rx wiring line RL arranged on the first substrate SUB1 side by the conductive pearls 31 contained in the seal material 30.

The alignment film AL2 covers the overcoat layer OC, the second shield electrode SE2 and the detection electrode Rx and is in contact with the liquid crystal layer LC, in the area where the liquid crystal layer LC is arranged in the peripheral area SA.

The constitution in which the liquid crystal mode, which is classified into two modes according to the direction of application of the electric field to change the alignment of the liquid crystal molecules contained in the liquid crystal layer LC, is what is called a longitudinal electric field mode, is exemplified in FIG. 5, and this constitution is also applicable to the case where the liquid crystal mode is what is called a lateral electric field mode. The longitudinal electric field mode implies, for example, twisted nematic (TN) mode, vertical alignment (VA) mode, and the like. In addition, the above-described lateral electric field mode implies, for example, the In-Plane Switching (IPS) mode, the Fringe Field Switching (FFS) mode which is one of the IPS modes, and the like. When the lateral electric field mode is adopted, the common electrode CE provided in the display area DA is provided on the first substrate SUB1 side and faces the pixel electrode PE through a thin insulating layer.

FIG. 6 is an exploded perspective view showing a partial configuration located in the peripheral area SA of the display device DSP1 according to the present embodiment, and FIG. 7 is a plan view showing a partial configuration located in the peripheral area SA of the display device DSP1 according to the present embodiment. In FIG. 6 and FIG. 7, several constituent elements are illustrated in a different size from the actual size to make the vertical relationship and size of each constituent element easier to understand.

As shown in FIG. 6 and FIG. 7, the first shield electrode SE1 extends from an area in which the sealant 30 is not arranged to a part of the area in which the sealant 30 is arranged. The first shield electrode SE1 is connected to the first shield wiring line SL1 through a contact hole formed at a position overlapped on the sealant 30 in planar view, which has been described with reference to FIG. 5 and is not therefore illustrated.

The Rx terminal portion RT is provided on the same layer as the first shield electrode SE1. An entire surface of the Rx terminal portion RT is overlapped on the sealant 30 in planar view, unlike the first shield electrode SE1. A predetermined interval is provided between the first shield electrode SE1 and the Rx terminal portion RT.

As shown in FIG. 6 and FIG. 7, the first shield electrode SE1 is overlapped on the interlayer insulating film 12 and covered with the interlayer insulating film 12, in planar view. According to this, the first shield electrode SE1 can be prevented from being electrically connected to the detection electrode Rx on the second substrate SUB2 side via the conductive pearls 31 contained in the sealant 30.

As shown in FIG. 6 and FIG. 7, the detection electrode Rx extends from the area where the sealant 30 is not arranged to the area where the sealant 30 is arranged, in the peripheral area SA. In the first area A1 overlapped on the sealant 30, the interlayer insulating film 12, and the first shield electrode SE1, the detection electrode Rx has a different shape from that in the second area A2 which is the other area, in planar view. More specifically, in planar view, the detection electrode Rx has a shape formed of a plurality of fine line portions in the first area A1 overlapped on the sealant 30, the interlayer insulating film 12, and the first shield electrode SE1 in planar view, and is formed in a flat plate shape parallel to the X-Y plane in the other second area A2.

As shown in FIG. 6 and FIG. 7, the detection electrode Rx has a plurality of fine line portions in a mesh shape that intersect each other and form a plurality of meshes, in the first area A1. The size of the opening portion of the mesh formed by the fine line portions is desirably larger than the diameter of the conductive pearl 31 contained in the sealant 30. The Width of the fine line portion is desirable smaller than the diameter of the conductive pearl 31 contained in the sealant 30.

As shown in FIG. 7, a wiring line group LG including a plurality of wiring lines L is provided under the first shield electrode SE1 and the Rx terminal portion RT, in the peripheral area SA. In FIG. 7, only some of the wiring lines L included in the wiring line group LG are illustrated in detail to prevent the drawing from becoming complicated, and other wiring lines L are illustrated in simplified form.

Advantages of the display device DSP1 according to the present embodiment will be described using a comparative example. The comparative example is intended to illustrate some of the advantages that the display device DSP1 according to the present embodiment can achieve, and does not exclude from the scope of the present invention advantages that are common to the comparative example and the present embodiment.

FIG. 8 is an exploded perspective view showing a partial configuration located in the peripheral area SA of the display device DSP1 according to the comparative example, and FIG. 9 is a plan view showing a partial configuration located in the peripheral area SA of the display device DSP1 according to the comparative example.

As shown in FIG. 8 and FIG. 9, the display device DSP1' in the comparative example is different from the configuration of the display device DSP1 of the present embodiment in that the detection electrode Rx is also formed in a flat plate shape parallel to the X-Y plane in the first area A1, similarly to that in the second area A2.

In the display device DSP1' in the comparative example, the detection electrode Rx is also formed in a flat plate shape parallel to the X-Y plane in the first area A1, and there is a risk that if the interlayer insulating film 12 is cracked during the manufacturing process of the display device DSP1', the first shield electrode SE1 and the detection electrode Rx on the second substrate SUB2 side may be electrically connected via the conductive pearls 31 contained in the sealant 30 and short-circuiting may occur.

In contrast, in the display device DSP1 according to the present embodiment, the detection electrode Rx is formed of the fine line portions in a mesh shape in the first area A1 and, even if the interlayer insulating film 12 is cracked during the manufacturing process of the display device DSP1, the risk that the first shield electrode SE1 exposed by the crack and the detection electrode Rx on the second substrate SUB2 side may be electrically connected via the conductive pearls 31 contained in the sealant 30 can be reduced.

More specifically, since the detection electrode Rx is formed of the fine line portions in a mesh-like shape in the first area A1, the electrode area of the detection electrode Rx on which the first shield electrode SE1 exposed by the above-mentioned crack is overlapped in planar view can be made smaller as compared with the configuration according to the comparative example, and the risk that the detection electrode Rx and the first shield electrode SE1 may be electrically connected via the conductive pearls 31 can be reduced.

Since the electrode area of the entire detection electrode Rx can be made smaller by forming the detection electrode Rx of the fine line portions in a mesh shape in the first area A1, the capacitance that increases when an external proximate object such as a finger contacts becomes smaller, and the time constant can also be made smaller accordingly. By reducing the time constant, it is possible to increase the number of pulses for touch detection to reduce noise, to reduce the touch detection period for touch detection to increase the display period for displaying an image, to reduce the time required for signal processing, and the like. In addition, by reducing the capacitance that increases when an external proximity object such as a finger contacts, it is possible to keep the capacitance within the upper limit of the detection range of the touch controller TC or to provide a margin in the upper limit of the detection range.

Another shape of the detection electrode Rx capable of reducing the risk that the detection electrode Rx and the first shield electrode SE1 may be electrically connected via the conductive pearls 31 in the first area A1 will be described as a modified example of the present embodiment.

Modified Example 1 of First Embodiment

Figure 10:
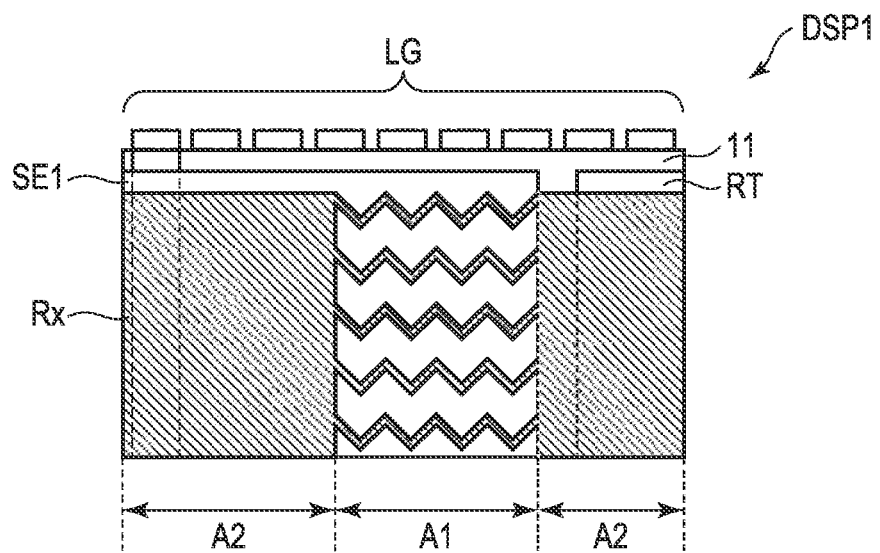
FIG. 10 is a plan view showing a partial configuration located in the peripheral area of the display device according to a modified example of the first embodiment.

FIG. 10 is a plan view showing the shape of the detection electrode Rx according to the modified example. Illustration of the interlayer insulating film 12 and the sealant 30 is omitted in FIG. 10. As shown in FIG. 10, the detection electrode Rx may include a plurality of fine line portions in a zigzag line shape in the first area A1. The fine line portions in the zigzag line shape are arranged and spaced apart at predetermined intervals and are formed so as not to intersect each other. The above-mentioned predetermined interval, that is, the interval between one fine line portion in the zigzag line shape and the other fine line portion in the zigzag line shape adjacent to the fine line portion in the zigzag line shape is desirably larger than the diameter of the conductive pearls 31 contained in the sealant 30.

In the shape shown in FIG. 10, too, since the electrode area of the detection electrode Rx on which the first shield electrode SE1 exposed by the above-mentioned crack is overlapped in planar view can also be made smaller, in the first area A1, as compared with the configuration according to the above-described comparative example (i.e., the configuration in which the detection electrode Rx is formed in a flat plate shape in the first area A1), the same advantages as those described above can be obtained.

In the first area A1, the detection electrode Rx may not have the fine line portions in the zigzag line shape, but a plurality of fine line portions in a straight line shape or a plurality of fine line portions in a wavy line shape. In either case, since the electrode area of the detection electrode Rx in the first area A1 can be made smaller as compared with the configuration according to the above-described comparative example, the same advantages as those described above can be obtained.

In the present embodiment described above, in the first area A1 where there is a risk that the detection electrode Rx and the first shield electrode SE1 may be electrically connected via the conductive pearls 31, the risk can be reduced by forming the detection electrode Rx in a shape formed of fine line portions. From the viewpoint of reducing the above-described risk, however, not the detection electrode Rx, but the first shield electrode SE1 may have a shape composed of fine line portions in the first area A1. That is, the first shield electrode SE1 may have the fine line portions in the mesh shape, the fine line portions in the zigzag line shape, the fine line portions in the straight line shape, or the fine line portions in the wavy line shape, in the first area A1.

In this case, too, since the electrode area of the first shield electrode SE1 overlapped on the detection electrode Rx in planar view can be reduced in the first area A1, it is possible to reduce the above-described risk and to obtain the same effect as described above.

In a case where the first shield electrode SE1 has a shape formed of the fine line portions in the first area A1, since the detection electrode Rx cannot be shielded from capacitive coupling with the wiring line L included in the wiring line group LG, in the gap between the fine line portions cannot be shielded, it is desirable that the wiring line L included in the wiring line group LG is not provided under the first shield electrode SE1 in the first area A1.

Figure 11:
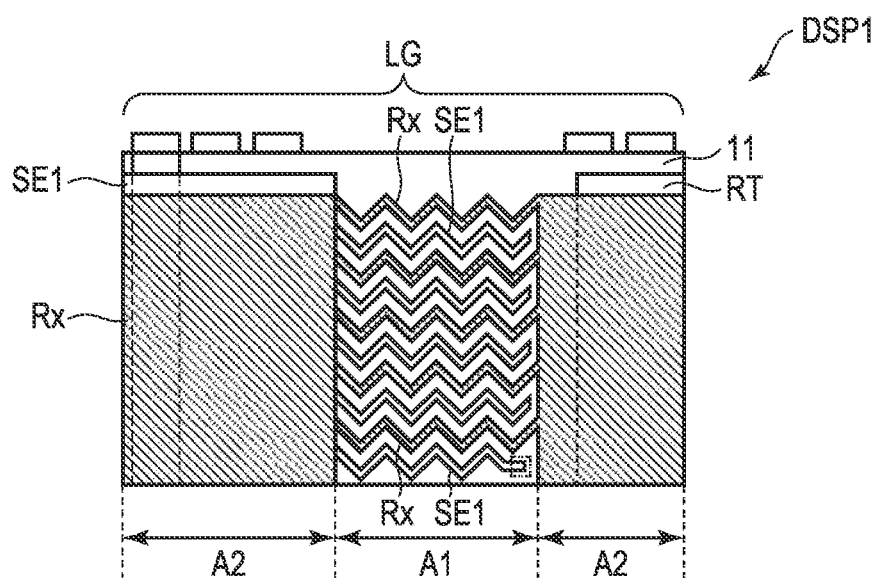
FIG. 11 is a plan view showing a partial configuration located in the peripheral area of the display device according to another modified example of the first embodiment.

In addition, both the detection electrode Rx and the first shield electrode SE1 may have a shape formed of the fine line portions in the first area A1, in terms of reducing the above-described risk. In this case, it is desirable that the fine line portions of the detection electrode Rx and the fine line portions of the first shield electrode SE1 are formed so as not to be overlapped in planar view, as shown in FIG. 11. In FIG. 11, too, similarly to FIG. 10, illustration of the interlayer insulating film 12 and the sealant 30 is omitted.

For this reason, it is desirable that the fine line portions of the detection electrode Rx and the fine line portions of the first shield electrode SE1 are formed not in a mesh shape, but in a zigzag line shape, a straight line shape, or a wavy line shape. According to this, the detection electrode Rx and the first shield electrode SE1 are not overlapped each other in planar view, in the first area A1 and, even if the first shield electrode SE1 is exposed by the above-described crack, the detection electrode Rx and the first shield electrode SE1 are not electrically connected via the conductive pearl 31, and the above-described risk can be eliminated. Note that, the fact that the detection electrode Rx and the first shield electrode SE1 are not overlapped each other in planar view includes the fact that the detection electrode Rx and the first shield electrode SE1 are arranged alternately in planar view, and the fact that the fine line portions of one electrode is arranged between the fine line portions of the other electrode in planar view. As shown in FIG. 11, the tip of the fine line portions of the first shield electrode SE1 may not be connected anywhere. As shown in FIG. 11, the tip of the fine line portions of the first shield electrode SE1 may not be overlapped in planar view with the detection electrode Rx located in the second area A2.

In the case where both the detection electrode Rx and the first shield electrode SE1 have a shape formed of the fine line portions, in the first area A1, capacitive coupling of the detection electrode Rx with the wiring line L included in the wiring line group LG cannot be shielded in gaps between the fine line portions of the first shield electrode SE1, and it is therefore desirable that no wiring line L included in the wiring line group LG be provided under the first shield electrode SE1 in the first area A1 as shown in FIG. 11.

The display device DSP1 of the first embodiment described above has a configuration in which at least one of the detection electrode Rx and the first shield electrode SE1 has a shape formed of the fine line portions, in the first area A1 where the detection electrode Rx, the sealant 30, the interlayer insulating film 12, and the first shield electrode SE1 are overlapped in planar view. According to this, even if the interlayer insulating film 12 covering the first shield electrode SE1 is cracked and a part of the first shield electrode SE1 is exposed during the manufacturing process of the display device DSP1, the risk that the detection electrode Rx and the first shield electrode SE1 may be electrically connected via the conductive pearls 31 contained in the sealant 30 and thus a short circuit may occur can be reduced.

Second Embodiment

Figure 12:
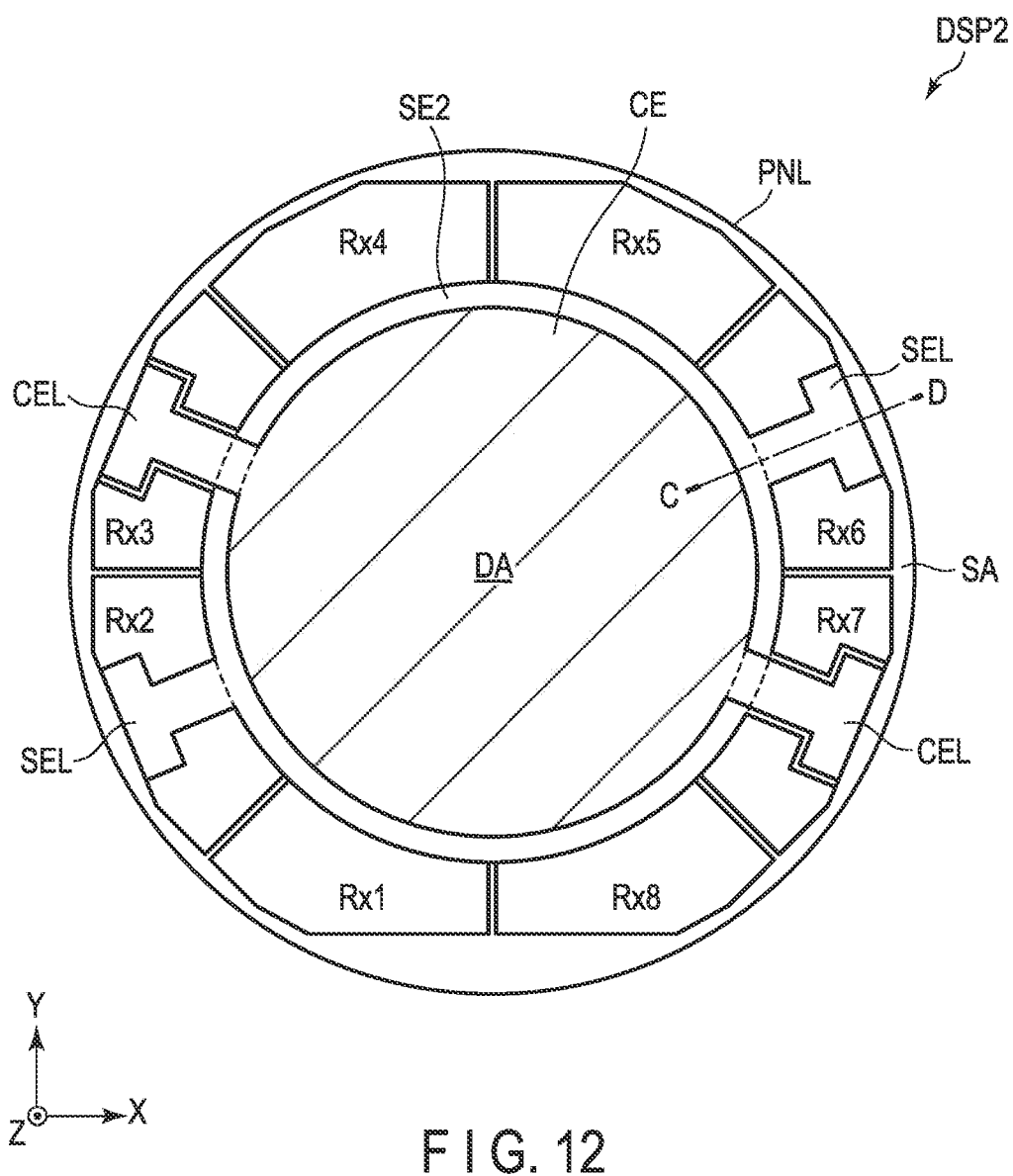
FIG. 12 is a plan view showing a configuration example of a display device according to a second embodiment.

Next, a second embodiment will be described. FIG. 12 is a plan view showing a configuration example of a display device DSP2 according to a second embodiment, and FIG. 13 is a cross-sectional view showing a cross section of the display device 2 taken along line C-D of FIG. 12.

Figure 13:
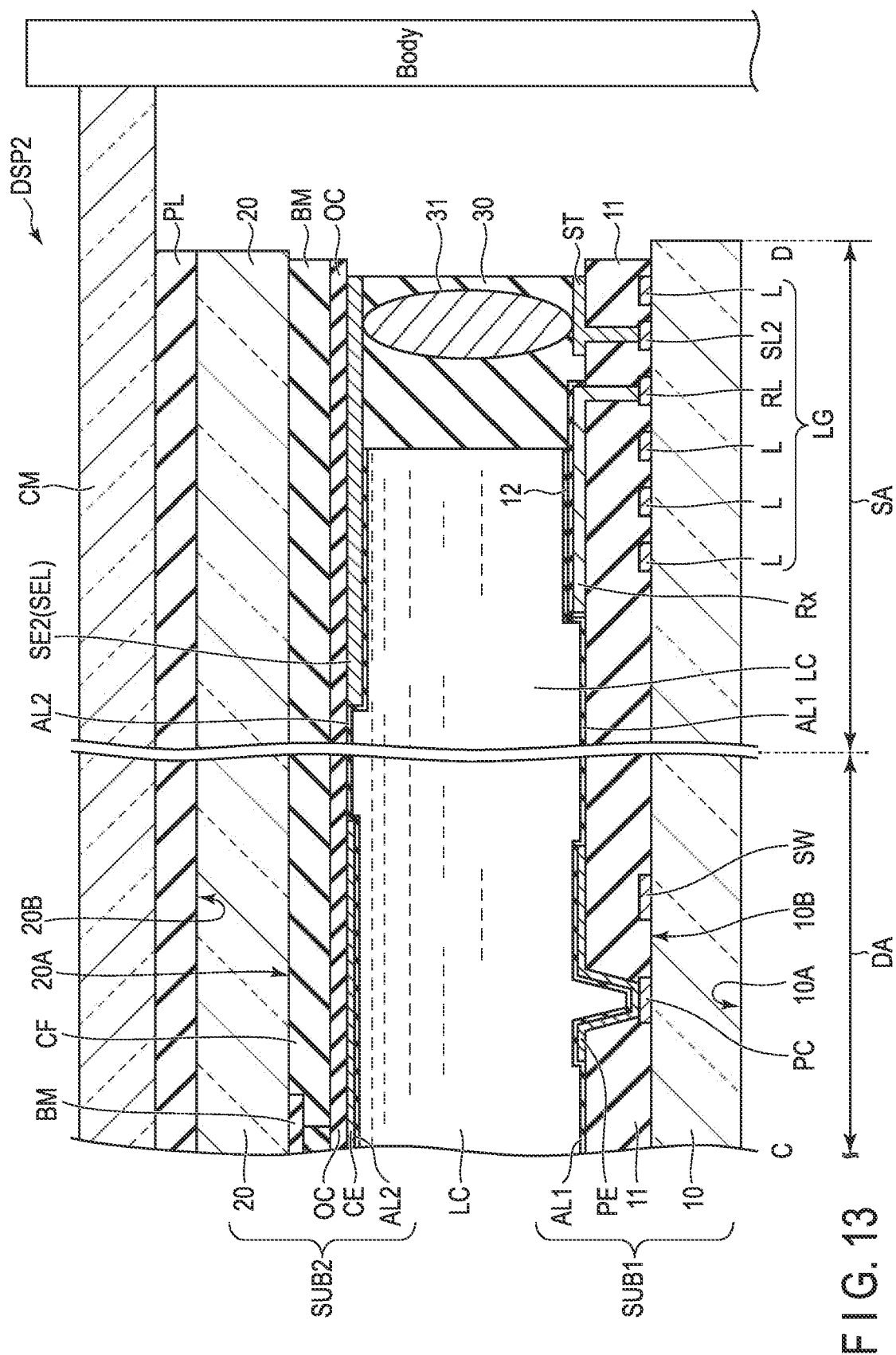
FIG. 13 is a cross-sectional view showing a cross section of the display device taken along line C-D of FIG. 12.

The display device DSP2 according to the second embodiment is different from the above-described configuration of the first embodiment in that a detection electrode Rx is arranged on a first substrate SUB1 side as shown in FIG. 13. In addition, the display device DSP2 according to the second embodiment is different from the above-described configuration of the first embodiment in that a first shield electrode SE1 is not arranged on a first substrate SUB1 side as shown in FIG. 12 and FIG. 13. Specific constituent elements of the display device DSP2 according to the second embodiment will be mainly described and description of the same configuration as that of the first embodiment will be omitted below.

As shown in FIG. 12, a first lead wiring line CEL drawn from a common electrode CE extends to outer peripheries of detection electrodes Rx3 to Rx7, and is electrically connected to a wiring line (not shown) for applying power to the common electrode CE via conductive pearls 31 contained in a sealant 30.

In addition, as shown in FIG. 12, a second lead wiring line SEL drawn from a second shield electrode SE2 arranged to surround the common electrode CE extends to outer peripheries of detection electrodes Rx2 and Rx6, and is electrically connected to a wiring line for applying power to the second shield electrode SE2 to be described later, via the conductive pearls 31 contained in the sealant 30, in planar view.

As shown in FIG. 13, a detection electrode Rx is provided on a planarization film 11, and is connected to an Rx wiring line RL, which is one of the wiring lines included in a wiring line group LG, through a contact hole formed in the planarization film 11. The above-mentioned contact hole is formed at a position overlapped on the sealant 30 in planar view. That is, the detection electrode Rx extends from an area where the sealant 30 is not arranged, in the peripheral area SA (i.e., an area where a liquid crystal layer LC is arranged in the peripheral area SA) to a part of the area where the sealant 30 is arranged, and is connected to the Rx wiring line RL through the above-mentioned contact hole.

In addition, as shown in FIG. 13, an interlayer insulating film 12 is provided on the detection electrode Rx to cover the detection electrode Rx.

As shown in FIG. 13, the second shield electrode SE2 extends from the area where the sealant 30 is not arranged in the peripheral area SA (i.e., the area where the liquid crystal layer LC is arranged in the peripheral area SA) to the area where the seal material 30 is arranged, and is electrically connected to a shield terminal portion ST and a second shield wiring line SL2 arranged on the first substrate SUB1 side by the conductive pearls 31 contained in the seal material 30.

A GND voltage (with a same potential as the detection electrode Rx) or a predetermined DC voltage (fixed voltage) is applied to the second shield electrode SE2 via the second shield wiring line SL2, the shield terminal portion ST, and the conductive pearls 31. According to this, the second shield electrode SE2 can suppress the detection electrode Rx from being capacitively coupled with other constituent elements (for example, the pixel electrode PE and the common electrode CE on the display area DA side).

Figure 14:
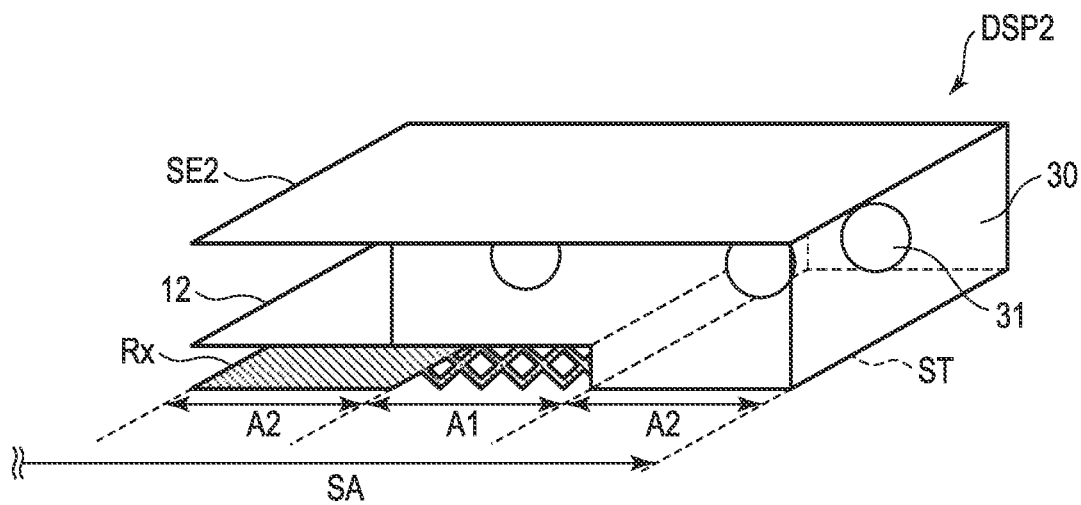
FIG. 14 is an exploded perspective view showing a partial configuration located in a peripheral area of the display device according to the embodiment.
Figure 15:
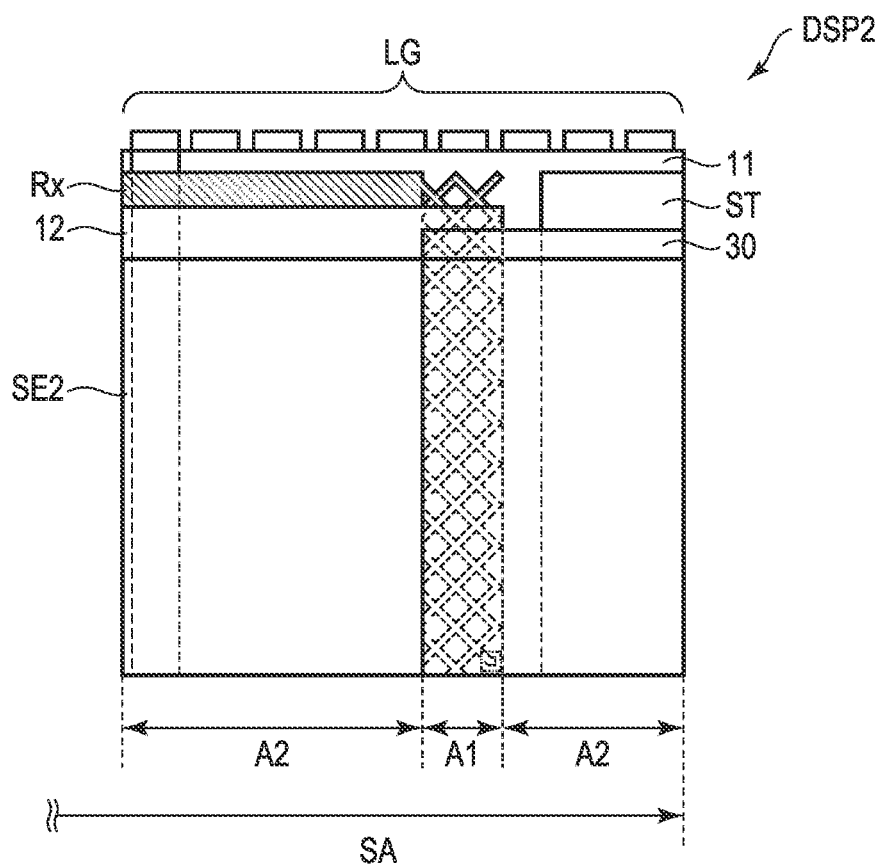
FIG. 15 is a plan view showing a partial configuration located in the peripheral area of the display device according to the embodiment.

FIG. 14 is an exploded perspective view showing a partial configuration located in the peripheral area SA of the display device DSP2 according to the present embodiment, and FIG. 15 is a plan view showing a partial configuration located in the peripheral area SA of the display device DSP2 according to the present embodiment. In FIG. 14 and FIG. 15, several constituent elements are illustrated in a different size from the actual size to make the vertical relationship and size of each constituent element easier to understand.

As shown in FIG. 14 and FIG. 15, the detection electrode Rx extends from the area where the sealant 30 is not arranged to a part of the area where the sealant 30 is arranged, in the peripheral area SA. The detection electrode Rx is connected to the Rx wiring line RL through a contact hole formed at a position overlapped on the sealant 30 in planar view, which has been described with reference to FIG. 13 and is not therefore illustrated.

The shield terminal portion ST is provided on the same layer as the detection electrode Rx. An entire surface of the shield terminal portion ST is overlapped on the sealant 30 in planar view, unlike the detection electrode Rx. A predetermined interval is provided between the detection electrodes Rx and the shield terminal portion ST.

As shown in FIG. 14 and FIG. 15, the detection electrode Rx is overlapped on the interlayer insulating film 12 and covered with the interlayer insulating film 12, in planar view. According to this, the detection electrode Rx can be prevented from being electrically connected to the second shield electrode SE2 on the second substrate SUB2 side via the conductive pearls 31 contained in the sealant 30.

As shown in FIG. 14 and FIG. 15, the second shield electrode SE2 extends from the area where the sealant 30 is not arranged to the area where the sealant 30 is arranged, in the peripheral area SA. In the first area A1 overlapped on the interlayer insulating film 12, the sealant 30, and the second shield electrode SE2, the detection electrode Rx has a different shape from that in the second area A2 which is the other area, in planar view. More specifically, in planar view, the detection electrode Rx has a shape formed of a plurality of fine line portions in the first area A1 overlapped on the interlayer insulating film 12, the sealant 30, and the second shield electrode SE2 in planar view, and is formed in a flat plate shape parallel to the X-Y plane in the other second area A2. As shown in FIG. 15, the tip of the fine line portions of the detection electrode Rx may not be connected anywhere. The tip of the fine line portions of the detection electrode Rx may not be overlapped in planar view with the second shield electrode SE2 located in the second area A2.

As shown in FIG. 14 and FIG. 15, the detection electrode Rx has a plurality of fine line portions in a mesh shape that intersect each other and form a plurality of meshes, in the first area A1. The size of the opening portion of the mesh formed by the fine line portions is desirably larger than the diameter of the conductive pearl 31 contained in the sealant 30. The Width of the fine line portion is desirable smaller than the diameter of the conductive pearl 31 contained in the sealant 30.

As shown in FIG. 15, a wiring line group LG including a plurality of wiring lines L is provided under the detection electrode Rx and the shield terminal portion ST, in the peripheral area SA.

As shown in FIG. 14 and FIG. 15, the detection electrode Rx includes the fine line portions in a mesh shape in the first area A1 and, even if the interlayer insulating film 12 is cracked during the manufacturing process of the display device DSP2, the risk that the detection electrode Rx exposed by the crack and the second shield electrode SE2 on the second substrate SUB2 side may be electrically connected via the conductive pearls 31 contained in the sealant 30 can be reduced.

More specifically, since the detection electrode Rx includes the fine line portions in a mesh-like shape in the first area A1, the electrode area of the detection electrode Rx exposed by the above-mentioned crack can be made smaller, and the risk that the detection electrode Rx and the second shield electrode SE2 may be electrically connected via the conductive pearls 31 and a short circuit may occur can be reduced.

Since the electrode area of the entire detection electrode Rx can be made smaller by forming the detection electrode Rx of the fine line portions in a mesh shape in the first area A1, the capacitance that increases when an external proximate object such as a finger contacts becomes smaller, and the time constant can also be made smaller accordingly. That is, in the display device DSP2 according to the present embodiment, too, touch of a foreign proximate object such as a finger can be detected in a short time, similarly to the display device DSP1 according to the first embodiment.

Another shape of the detection electrode Rx capable of reducing the risk that the detection electrode Rx and the second shield electrode SE2 may be electrically connected via the conductive pearls 31 in the first area A1 will be described as a modified example of the present embodiment.

Modified Example of Second Embodiment

Figure 16:
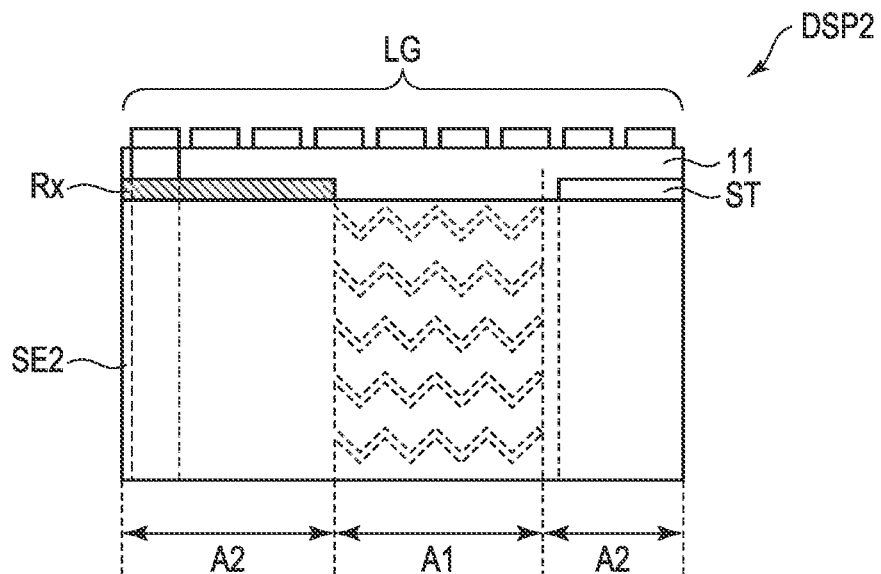
FIG. 16 is a plan view showing a partial configuration located in the peripheral area of the display device according to a modified example of the second embodiment.

FIG. 16 is a plan view showing the shape of the detection electrode Rx according to the modified example. Illustration of the interlayer insulating film 12 and the sealant 30 is omitted in FIG. 16. As shown in FIG. 16, the detection electrode Rx may include a plurality of fine line portions in a zigzag line shape in the first area A1. The fine line portions in the zigzag line shape are arranged and spaced apart at predetermined intervals and are formed so as not to intersect each other. The above-mentioned predetermined interval, that is, the interval between one fine line portion in the zigzag line shape and the other fine line portion in the zigzag line shape adjacent to the fine line portion in the zigzag line shape is desirably larger than the diameter of the conductive pearls 31 contained in the sealant 30.

In the shape shown in FIG. 16, too, since the electrode area of the detection electrode Rx in the first area A1 can be made smaller as compared with, for example, the configuration of being formed in a flat plate shape, similarly to that in the second area A2, the same advantages as those described above can be obtained.

In the first area A1, the detection electrode Rx may not have the fine line portions in the zigzag line shape, but a plurality of fine line portions in a straight line shape or a plurality of fine line portions in a wavy line shape. In either case, since the electrode area of the detection electrode Rx in the first area A1 can be made smaller as compared with the configuration of being formed in a flat plate shape, similarly to that in the second area A2, the same advantages as those described above can be obtained.

In the present embodiment described above, in the first area A1 where there is a risk that the detection electrode Rx and the second shield electrode SE2 may be electrically connected via the conductive pearls 31, the risk can be reduced by forming the detection electrode Rx in a shape formed of fine line portions. From the viewpoint of reducing the above-described risk, however, not the detection electrode Rx, but the second shield electrode SE2 may have a shape composed of fine line portions in the first area A1. That is, the second shield electrode SE2 may have the fine line portions in the mesh shape, the fine line portions in the zigzag line shape, the fine line portions in the straight line shape, or the fine line portions in the wavy line shape, in the first area A1.

In this case, too, since the electrode area of the second shield electrode SE2 overlapped on the detection electrode Rx in planar view can be reduced in the first area A1, it is possible to reduce the above-described risk and to obtain the same effect as described above.

Figure 17:
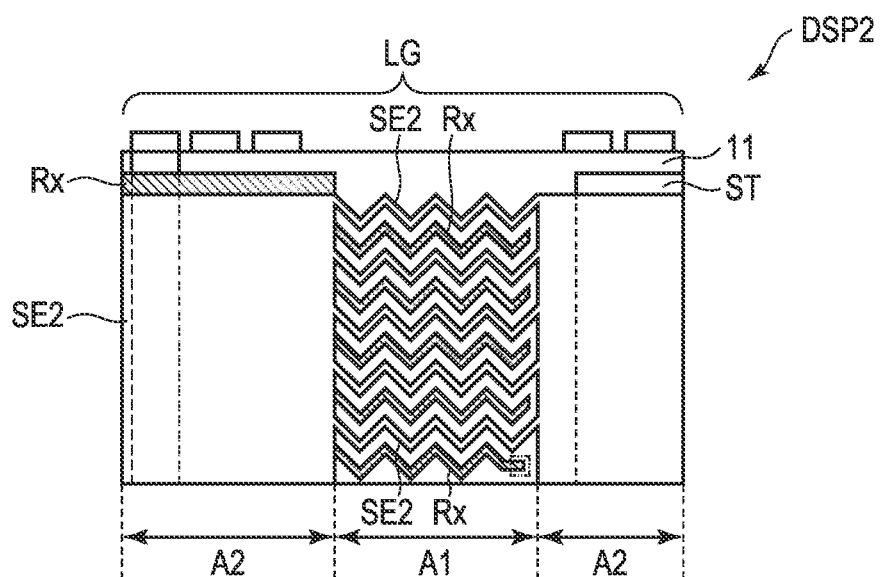
FIG. 17 is a plan view showing a partial configuration located in the peripheral area of the display device according to another modified example of the second embodiment.

In addition, both the detection electrode Rx and the second shield electrode SE2 may have a shape formed of the fine line portions in the first area A1, in terms of reducing the above-described risk. In this case, it is desirable that the fine line portions of the detection electrode Rx and the fine line portions of the second shield electrode SE2 are formed so as not to be overlapped in planar view, as shown in FIG. 17. In FIG. 17, too, similarly to FIG. 10, illustration of the interlayer insulating film 12 and the sealant 30 is omitted.

For this reason, it is desirable that the fine line portions of the detection electrode Rx and the fine line portions of the second shield electrode SE2 are formed not in a mesh shape, but in a zigzag line shape, a straight line shape, or a wavy line shape. According to this, the detection electrode Rx and the second shield electrode SE2 are not overlapped each other in planar view, in the first area A1 and, even if the detection electrode Rx is exposed by the above-described crack, the detection electrode Rx and the second shield electrode SE2 are not electrically connected via the conductive pearl 31, and the above-described risk can be eliminated. Note that, the fact that the detection electrode Rx and the second shield electrode SE2 are not overlapped each other in planar view includes the fact that the detection electrode Rx and the second shield electrode SE2 are arranged alternately in planar view, and the fact that the fine line portions of one electrode is arranged between the fine line portions of the other electrode in planar view. As shown in FIG. 17, the tip of the fine line portions of the detection electrode Rx may not be connected anywhere. The tip of the fine line portions of the detection electrode Rx may not be overlapped in planar view with the second shield electrode SE2 located in the second area A2.

The display device DSP2 of the second embodiment described above has a configuration in which at least one of the detection electrode Rx and the second shield electrode SE2 has a shape formed of the fine line portions, in the first area A1 where the detection electrode Rx, the interlayer insulating film 12, the sealant 30, and the second shield electrode SE2 are overlapped in planar view. According to this, even if the interlayer insulating film 12 covering the detection electrode Rx is cracked and a part of the detection electrode Rx is exposed during the manufacturing process of the display device DSP2, the risk that the detection electrode Rx and the second shield electrode SE2 may be electrically connected via the conductive pearls 31 contained in the sealant 30 and a short circuit may occur can be reduced.

Figure 18:
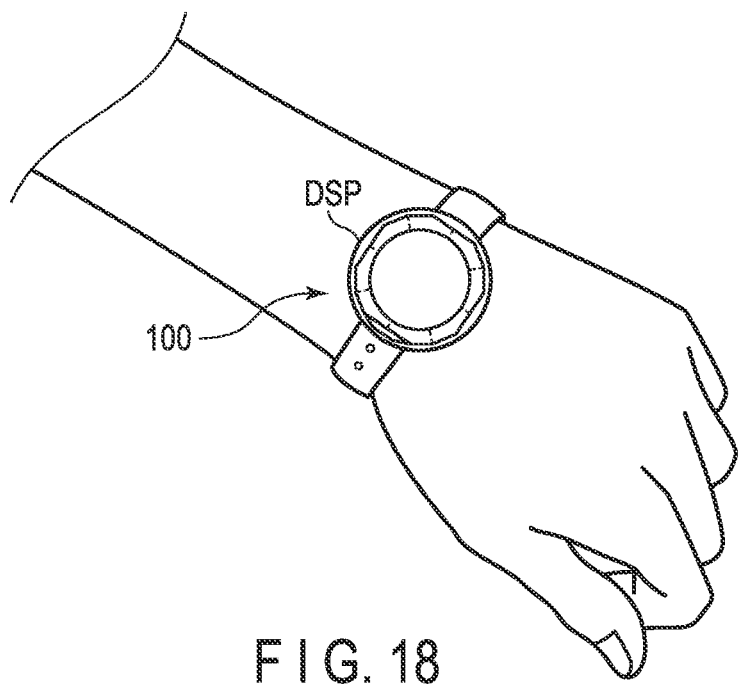
FIG. 18 is a view showing an application example of the display device according to each of the embodiments.

FIG. 18 shows an application example of the display device DSP according to each embodiment. As shown in FIG. 18, the display device DSP is applied to, for example, a wristwatch 100. In this case, the time and the like are displayed in the display area DA of the display device DSP, and the display device DSP can detect a predetermined gesture by touching a detection electrode arranged in the peripheral area SA (for example, a gesture to touch an outer peripheral part of a clock so as to rotate clockwise by one rotation, a gesture to touch an outer peripheral part of a clock so as to rotate counterclockwise by one rotation, a gesture to tap or the like) and can realize an operation according to the detected predetermined gesture.

Figure 19:
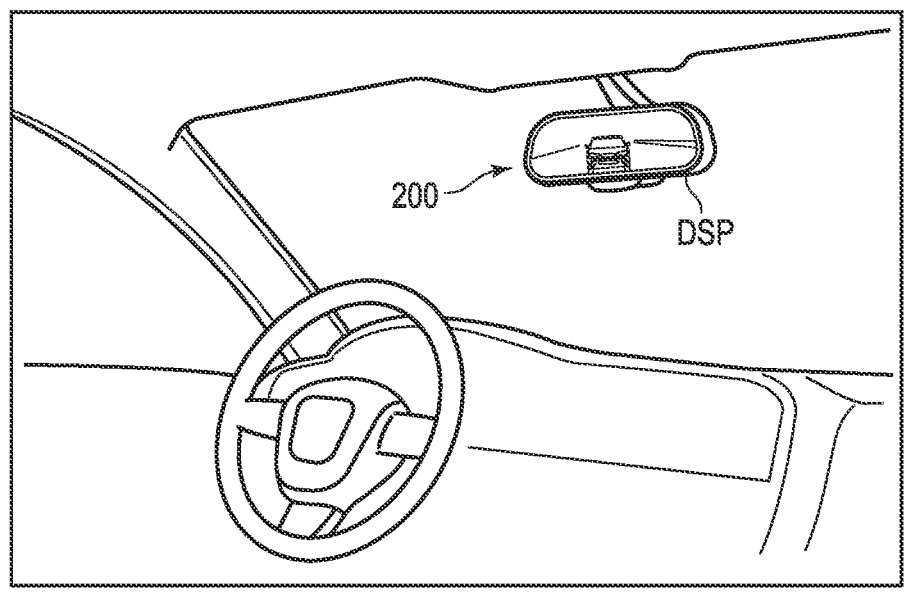
FIG. 19 is a view showing another application example of the display device according to each of the embodiments.

FIG. 19 shows another application example of the display device DSP according to each embodiment. As shown in FIG. 19, the display device DSP is applied to, for example, an in-vehicle rear-view mirror 200. In this case, an image and the like of a rear side of a vehicle captured by a camera installed in the vehicle is displayed in the display area DA of the display device DSP, and the display device DSP can detect a predetermined gesture by touching a detection electrode arranged in the peripheral area SA, and can realize an operation according to the detected predetermined gesture.

FIG. 20 is a diagram illustrating an example of a principle of self-capacitive touch detection. A voltage obtained by dividing the voltage of a power supply Vdd by a resistor division is supplied to the detection electrode Rx as a bias voltage. A drive signal of a predetermined waveform is supplied from a drive circuit 300b to the detection electrode Rx by capacitive coupling or the like, and a detection signal of a predetermined waveform is read from the detection electrode Rx. At this time, if a capacitance caused by a finger or the like is loaded on the detection electrode Rx, the amplitude of the detection electrode is varied. In FIG. 20, the amplitude of the detection electrode Rx is lowered. Therefore, in an equivalent circuit illustrated in FIG. 20, the presence or absence of contact or approach of an external proximate object such as a finger is detected by detecting the amplitude of the detection electrode Rx in the detection circuit 400b. The self-detection circuit is not limited to the circuit illustrated in FIG. 20, and any circuit system may be adopted as long as the presence or absence of an external proximate object such as a finger can be detected only by the detection electrode.

According to at least one embodiment described above, a display device capable of reducing the risk of unintended members being electrically connected to each other during a manufacturing process can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate;
a second substrate arranged opposite to the first substrate;
a sealant which bonds the first substrate and the second substrate and which is provided in a peripheral area surrounding a display area where an image is displayed;
a first electrode provided on the first substrate in the peripheral area;
an insulating film covering the first electrode; and
a second electrode provided on the second substrate in the peripheral area,
the sealant containing a conductive member, wherein
at least one of the first electrode and the second electrode includes a plurality of fine line portions in an area where the first electrode, the insulating film, the sealant, and the second electrode are overlapped in planar view,
the conductive member is a spherical conductive pearl, and
an interval between a first fine line portion included in the plurality of fine line portions and a second fine line portion adjacent to the first fine line portion is larger than a diameter of the conductive pearl.

2. The display device of claim 1, wherein
the second electrode is electrically connected to a wiring line provided on the first substrate side by the conductive member included in the sealant.

3. The display device of claim 1, further comprising:
a plurality of wiring lines provided on the first substrate and under the first electrode in the peripheral area.

4. The display device of claim 1, wherein
the second electrode includes the plurality of fine line portions, and
the first electrode does not include the plurality of fine line portions.

5. The display device of claim 1, wherein
the first electrode includes the plurality of fine line portions, and
the second electrode does not include the plurality of fine line portions.

6. The display device of claim 1, wherein
the first electrode and the second electrode both include the plurality of fine line portions.

7. The display device of claim 6, wherein
the plurality of fine line portions of the first electrode and the plurality of fine line portions of the second electrode are not overlapped in planar view.

8. The display device of claim 1, wherein
the second electrode is a detection electrode.

9. The display device of claim 8, wherein
the first electrode is a shield electrode having a predetermined fixed potential.

10. The display device of claim 1, wherein
the first electrode is a detection electrode.

11. The display device of claim 10, wherein the second electrode is a shield electrode having a predetermined fixed potential.

* * * * *